United States Patent
Coviello et al.

(10) Patent No.: US 10,411,444 B2
(45) Date of Patent: Sep. 10, 2019

(54) METHOD OF ASSEMBLING ELECTRICAL CONTROL PANEL WIRE HARNESS

(71) Applicant: Design Ready Controls, Inc., Brooklyn Park, MN (US)

(72) Inventors: Mario Daniel Coviello, Brooklyn Park, MN (US); Zachary Tyler Rausch, Brooklyn Park, MN (US); Troy Schmidtke, Brooklyn Park, MN (US)

(73) Assignee: Design Ready Controls, Inc., Brooklyn Park, MN (US)

( * ) Notice: Subject to any disclaimer, the term of this patent is extended or adjusted under 35 U.S.C. 154(b) by 210 days.

(21) Appl. No.: 15/238,279

(22) Filed: Aug. 16, 2016

(65) Prior Publication Data

US 2018/0054035 A1    Feb. 22, 2018

(51) Int. Cl.
*H02G 1/00* (2006.01)
*H01B 13/012* (2006.01)

(52) U.S. Cl.
CPC ......... *H02G 1/00* (2013.01); *H01B 13/01227* (2013.01); *H01B 13/01209* (2013.01)

(58) Field of Classification Search
CPC ............... H02G 1/00; H01B 13/01227; H01B 13/01209
See application file for complete search history.

(56) References Cited

U.S. PATENT DOCUMENTS

| | | |
|---|---|---|
| 5,168,904 A | 12/1992 | Quinkert |
| 5,404,634 A * | 4/1995 | Takeshita ............. H01R 43/055 29/33 M |
| 5,478,060 A | 12/1995 | Sugimoto et al. |
| 5,490,664 A | 2/1996 | Justus et al. |
| 5,535,511 A | 7/1996 | Karasik |
| 5,535,788 A | 7/1996 | Mori et al. |
| 5,694,678 A | 12/1997 | Karasik |
| 6,003,852 A * | 12/1999 | Kawamura ...... H01B 13/01209 269/287 |
| 6,125,532 A | 10/2000 | Takada |
| 6,296,240 B1 | 10/2001 | Nakai et al. |
| 6,308,944 B1 | 10/2001 | Ota et al. |
| 6,330,746 B1 | 12/2001 | Uchiyama et al. |
| 6,709,284 B1 | 3/2004 | Avlonitis |
| 6,865,087 B2 | 3/2005 | Jelinger |
| 6,867,768 B2 | 3/2005 | Sakakura et al. |

(Continued)

FOREIGN PATENT DOCUMENTS

| | | |
|---|---|---|
| GB | 2295497 B | 4/1998 |
| WO | 2008145081 A2 | 12/2008 |

OTHER PUBLICATIONS

Siemens, "Siemens PLM Software: Solid Edge Wire Harnessing Design—A dedicated process-driven environment for creating and routing wires and cables", available at www.siemens.com/solidedge; copyright 2014.

*Primary Examiner* — Minh N Trinh
(74) *Attorney, Agent, or Firm* — Haugen Law Firm PLLP

(57) ABSTRACT

A method is described that is suitable for automated use of peg apparatus and an electrical wire harness peg board. The pegs are utilized on a wire harness peg board during the assembly of a wire harness, and are particularly well suited for use in an automated assembly of the electrical wire harness where a constant upward, downward or lateral tension is desired without altering the free ends of each wire of a bundled wire harness.

12 Claims, 24 Drawing Sheets

(56) References Cited

U.S. PATENT DOCUMENTS

| | | |
|---|---|---|
| 7,516,541 B2 | 4/2009 | Furuya et al. |
| 7,653,987 B2 | 2/2010 | Tokuda et al. |
| 7,674,983 B2 | 3/2010 | Nakamura |
| 7,726,167 B2 | 6/2010 | Halford |
| 8,442,664 B1 | 5/2013 | Guglielmo et al. |
| 8,697,994 B2 | 4/2014 | Masaka |
| 8,704,623 B2 | 4/2014 | Dumonski |
| 8,996,347 B2 | 3/2015 | MacLean et al. |
| 9,054,434 B2 | 6/2015 | Kakuta et al. |
| 9,071,042 B2 | 6/2015 | Toyama |
| 9,306,378 B2 | 4/2016 | Murao et al. |
| 9,721,702 B1 * | 8/2017 | Guglielmo ........... H01B 13/012 |
| 10,242,771 B2 * | 3/2019 | Coviello .......... H01B 13/01245 |
| 2003/0163917 A1 * | 9/2003 | Davidshofer ....... B60R 16/0207 29/854 |
| 2007/0277372 A1 * | 12/2007 | Aida ..................... H01R 43/28 29/747 |
| 2010/0218369 A1 | 9/2010 | Selbach |
| 2014/0111963 A1 | 4/2014 | Satake et al. |
| 2015/0380860 A1 | 12/2015 | Moran et al. |
| 2016/0087414 A1 | 3/2016 | Satoh |

\* cited by examiner

METHOD OF ASSEMBLING ELECTRICAL CONTROL PANEL WIRE HARNESS

CROSS-REFERENCE TO RELATED APPLICATIONS

Not Applicable.

FEDERAL SPONSORSHIP

Not Applicable

JOINT RESEARCH AGREEMENT

Not Applicable

TECHNICAL FIELD

This invention pertains generally to the assembly of electrical wire harness assemblies. More particularly, the invention pertains to a method of utilizing pegs on a wire harness peg board during the assembly of a wire harness. The pegs are particularly well suited for use in an automated assembly of the wire harness where a constant upward, downward and lateral tension is desired without altering the free ends of each wire.

BACKGROUND

Over the years, electrical wiring schematic designs have been incorporated into many tools, equipment, and machinery. Once the wiring design is established, the wires are often cut to a desired length and then bundled together to form a wire harness. The wiring designs have been improved by analyzing and creating bundles of wires having optimal routing and organization of the wires within the tool, equipment, or machine to form an ideal wire harness. It is desirable to design the wire harnesses without an excessive bundle size or bends with too small a radius. Also, the thickness, length, desired slack, and stiffness of the wires, may be taken into account when designing wire harness. Although designing a wire harness has been automated, it is common to use a wire harness peg board to manually place wires on the peg board to assemble a wire harness. The manual assembly of the wire harness requires the placement of wires one at a time and fixing the ends of the wire so that the wires may be pulled taught as they're placed on the peg board. Fixing the ends of the wire may require an additional length of wire to allow for stripping or end finishing (for example, adding ferrules, connectors, lugs, etc.) of each wire after removal from the board.

Manual assembly of wire harnesses further increases potential for inconsistent routing of wires and inconsistent start/termination positions of each wire. The shortcomings of manual assembly may be overcome with the use of robotic aids. However, when the robot places the wires around cylindrical pegs, the wires tend to slip up and away from the pegs, thereby interfering with the robotic gripping fingers. Although clamping pegs have been improvised, the required clamping force tends to alter the insulation around the wires and may even dent or otherwise damage the wires.

SUMMARY

Embodiments according to aspects of the invention allow for the automated placement of wires on a wire harness peg board without requiring manual tie offs or clamps. The method of the present invention includes the steps of obtaining information for a wire set, analyzing the information for the wire set, determining a location of pegs on a wire harness peg board, creating automated assembly instructions; and placing wires on the peg board in accordance with the instructions. The method according to aspects of the invention also includes the use of a peg having a base, a main body, a bi-directional wire receiving portion and a bi-directional wire retaining portion. The base has a bottom portion suitable for coupling to a wire harness peg board. The main body extends upward from the base and includes the bi-directional wire receiving portion congruent with a mid-portion of the main body. The main body also includes the bi-directional wire retaining portion congruent with both the wire receiving portion and an upper portion of the main body. The bi-directional wire retaining portion restricts movement of the wire in both an upward and downward direction. Similarly, the wire retaining portion further restricts movement of the wire in a lateral, angular, tensile, and compressive directions.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
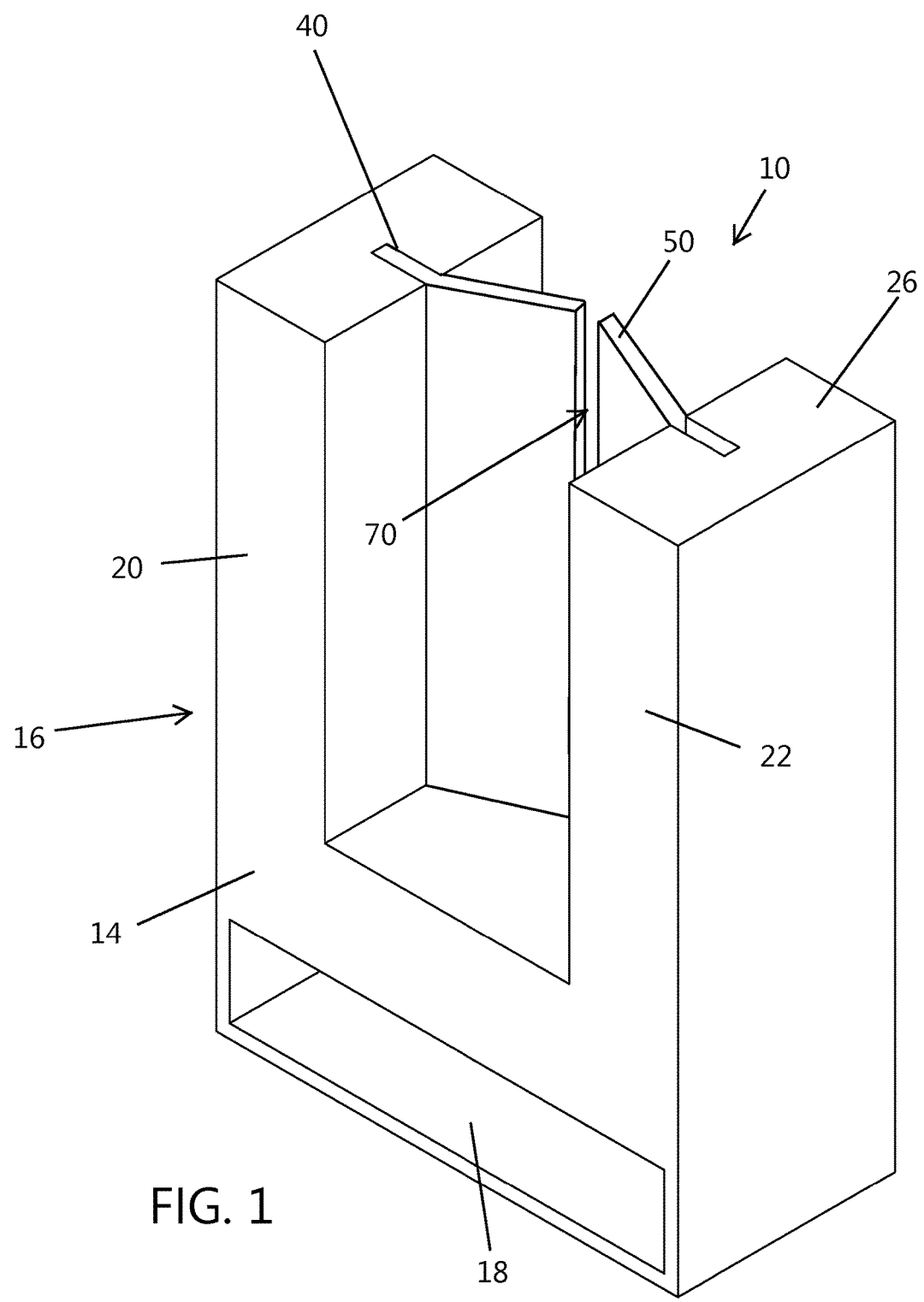
FIG. 1 is an upper, right, perspective view of an embodiment of a peg apparatus of the present invention.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The method of the present invention is particularly well suited for use in an automated assembly of electrical wire harnesses. Various embodiments of the method of the invention include the use of a peg apparatus 10 of the present invention having a base 14, a main body 16, a bi-directional wire receiving portion 60 and a bi-directional wire retaining portion 70. The base 14 has a bottom portion 18 suitable for coupling to a wire harness peg board. The main body 16 extends upward from the base 14 and includes the bi-directional wire receiving portion 60 congruent with a mid-portion of the main body 16. The main body 16 also includes the bi-directional wire retaining portion 70 that is at least congruent with both the wire receiving portion 60 and an upper portion 26 of the main body 16. The bi-directional wire receiving portion 60 restricts movement of the wire in both an upward and downward direction. Similarly, the wire retaining portion 70 further restricts movement of the wire in a lateral direction. The wire receiving portion 60 and wire retaining portion 70 firmly restricts angular, tensile and compressive movement in both lateral and vertical directions of the wire without requiring a force that alters the wire, wire casing, or wire ends. Those skilled in the art will appreciate that pegs 10 may be constructed in various shapes and configurations while still incorporating the wire receiving portion 60 and wire retaining portion 70. The pegs utilized with the method of the invention will first be described.

With reference to FIGS. 1-7, embodiments according to aspects of the invention will be described in conjunction with the peg apparatus 10 shown in these figures. The peg 10 includes a base 14, main body 16, first pair of slots 40, top 26, and magnet receiving pocket 32. The main body incudes first and second, opposed, upwardly extending sides 20 and 22 that together form a wire receiving portion or channel 60. The slots 40 formed in the opposing sides 20 and 22 are adapted for receiving bi-directional, pliable flaps 50. The opposing flaps 50 extend towards each other and may overlap or may be separated to form a slight gap between the opposing pair of flaps. A wire may be positioned down and into the wire receiving channel 60 and in contact with the pliable flaps 50. The amount of gap may be selected depending upon the type of wire being positioned in the wire receiving channel 60 and depending more generally upon the routing of the wire on the wire harness pegboard. The sides 20, 22 and flaps 50, 52 together form the wire retention portion 70. The separation distance may be defined by altering the width of the flaps to allow the wire to pass between the flaps 50 while providing flaps 50 that retain the wire in the channel and restrict vertical and lateral movement of the wire in the channel.

Figure 2:
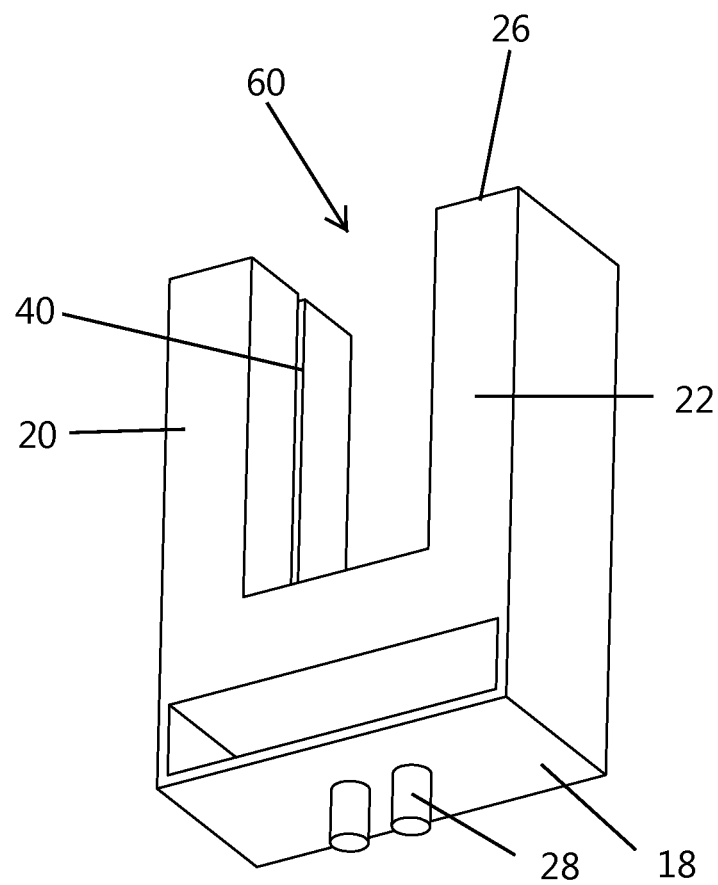
FIG. 2 is a lower, right, perspective view of an embodiment of a peg apparatus of the present invention, showing pins extending from a base of the peg.
Figure 3:
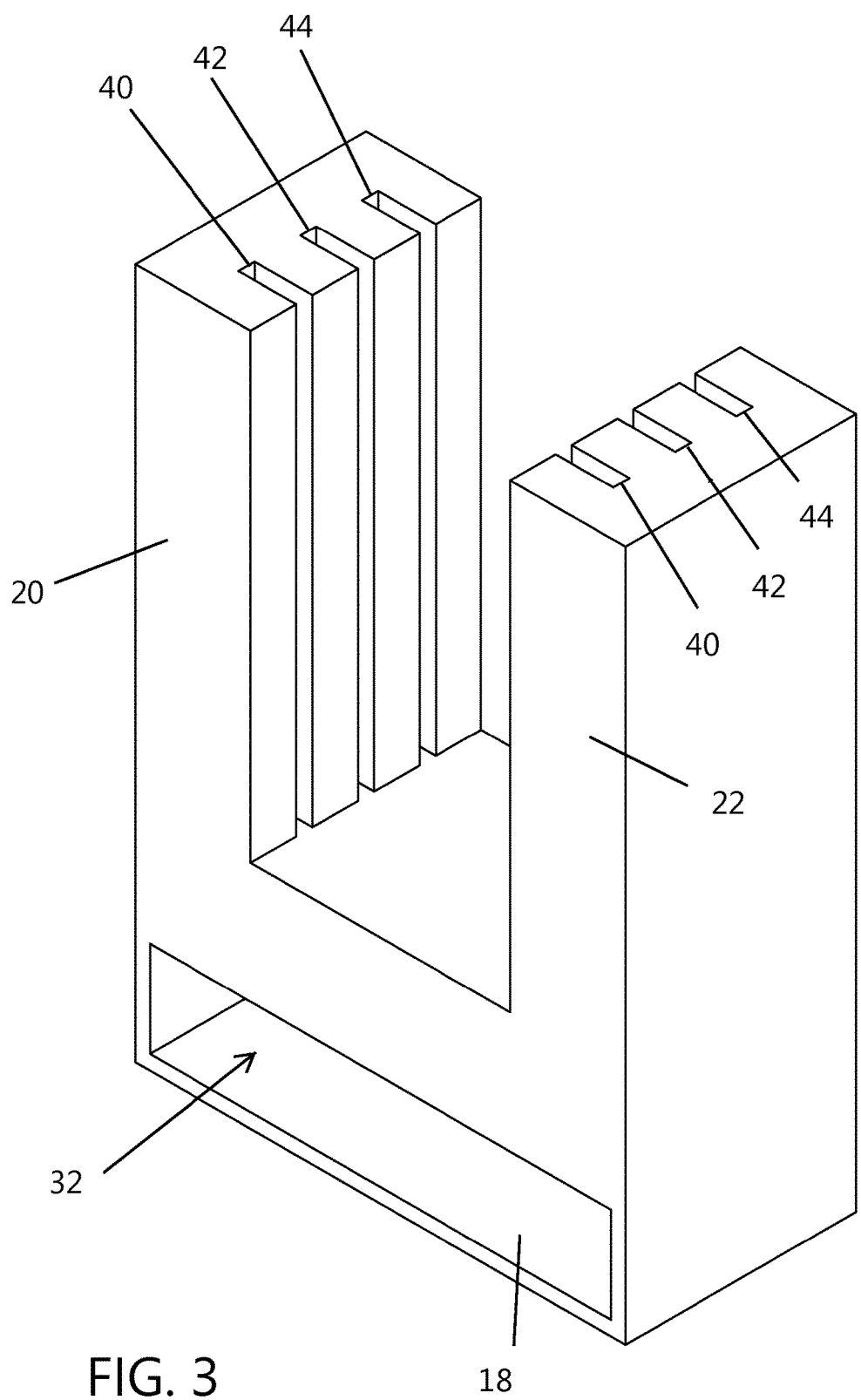
FIG. 3 is an upper, right, perspective view of an embodiment of a peg apparatus of the present invention, showing slots suitable to receive pliable rubber flaps.
Figure 4:
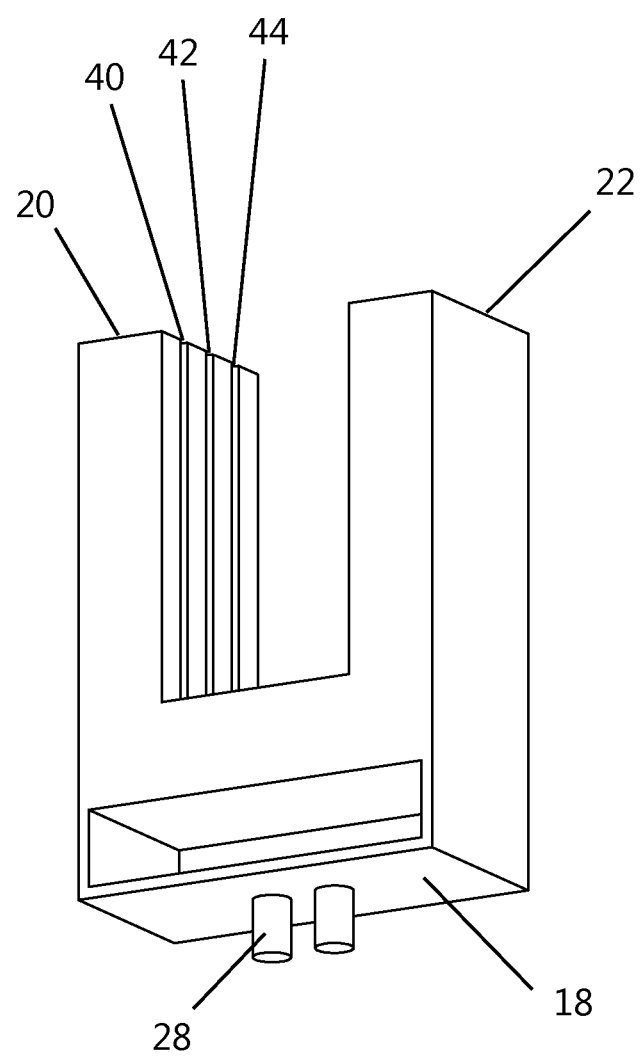
FIG. 4 is a lower, right, perspective view of an embodiment of a peg apparatus of the present invention, showing pins extending from a base of the peg.
Figure 5:
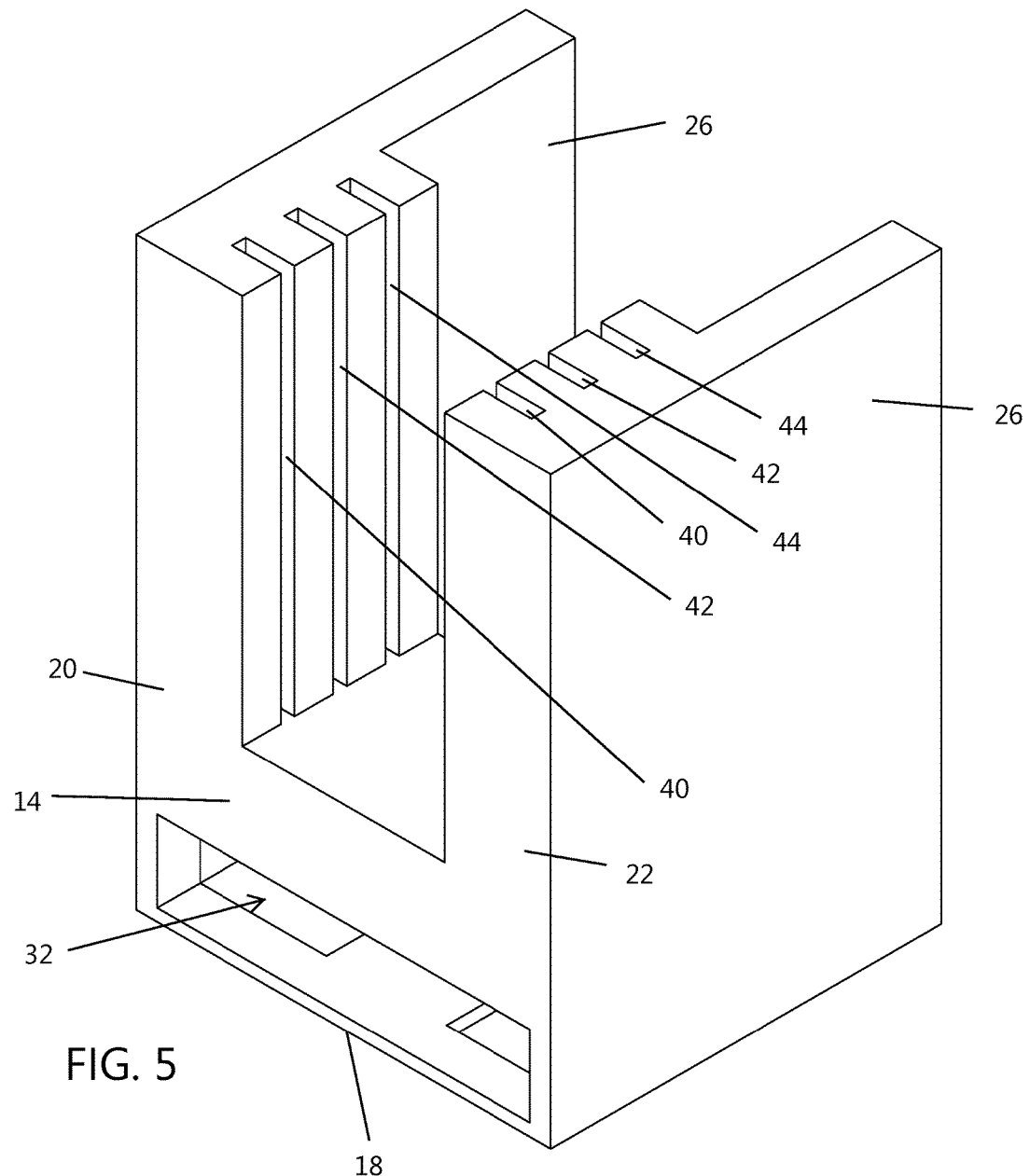
FIG. 5 is an upper, front perspective view of an embodiment of a peg apparatus of the present invention, showing slots suitable to receive pliable rubber flaps.
Figure 6:
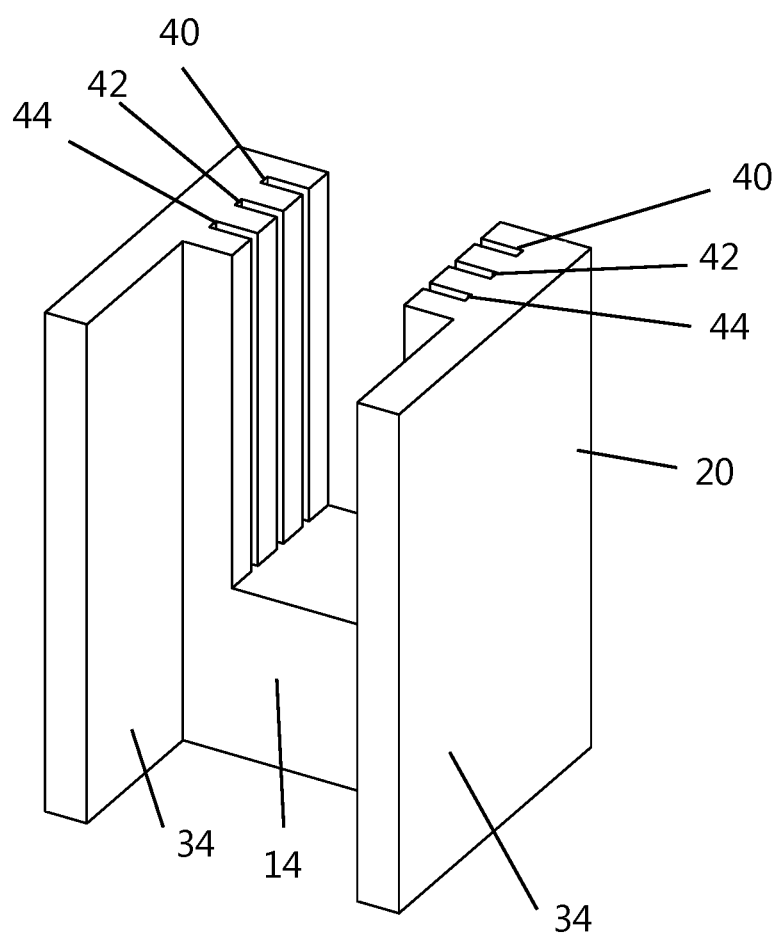
FIG. 6 is an upper back perspective view of the peg apparatus of the type shown in FIG. 5.
Figure 7:
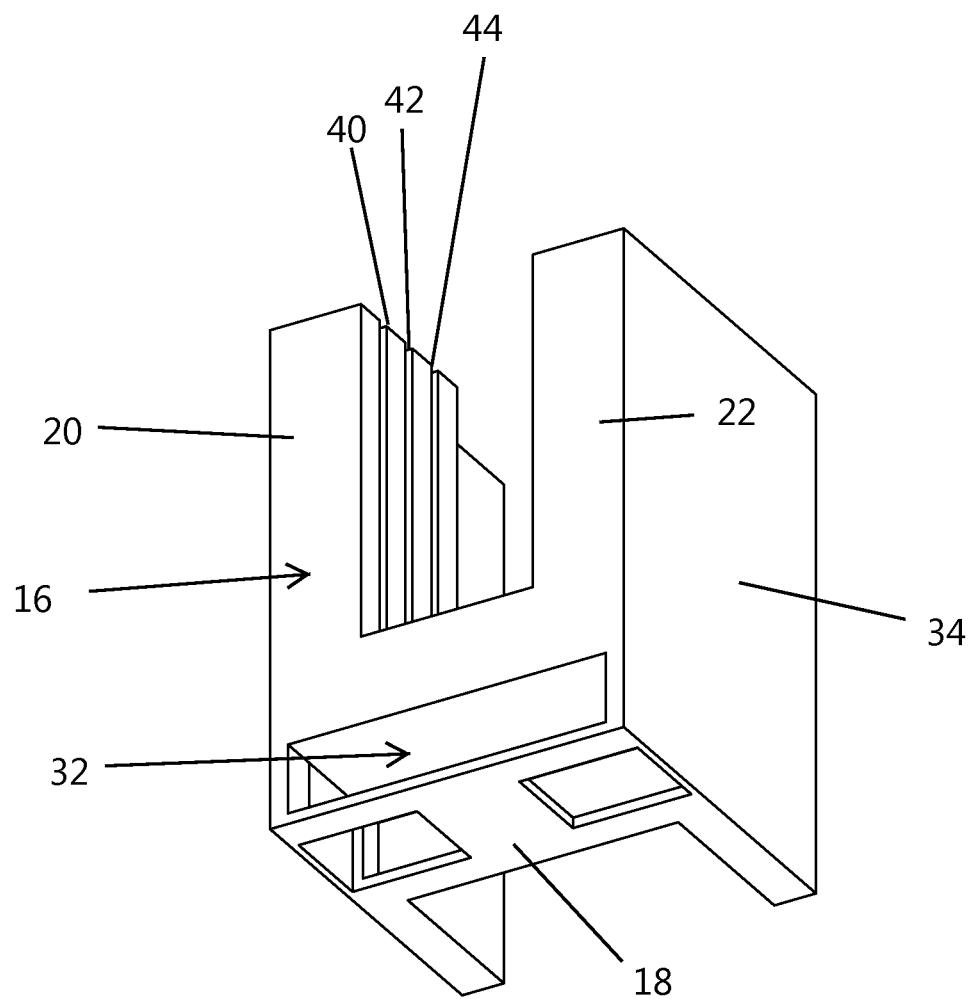
FIG. 7 is a lower front perspective view of the peg apparatus of the type shown in FIG. 5.

FIGS. 1 and 2 illustrate a peg 10 having a single pair of pliable flaps 50 positioned in the wire receiving channel 60. Alternatively, FIGS. 3 and 4 illustrate a triple pair of flaps 50, 52, and 54 positioned in pairs of slots 40, 42 and 44. FIGS. 5-7 also illustrate triple pairs of flaps 50, 52, and 54 positioned in pairs of slots 40, 42, and 44 and further illustrates extended sides 34 of the main body. The size, stiffness, and number of flap pairs may be chosen dependent upon the particular wire harness that is assembled. Additionally, FIGS. 2 and 4 show alignment pins 28 extending from the bottom 18 of the base 14. The alignment pins 28 may be utilized to couple the pegs 10 to a wire harness peg board in a desired location on the board. Alternatively, the magnet receiving pocket 32 is adapted to receive a magnet 30 that may be utilized in conjunction with a wire harness peg board made of a ferromagnetic material couple the peg 10 to the peg board.

Figure 8:
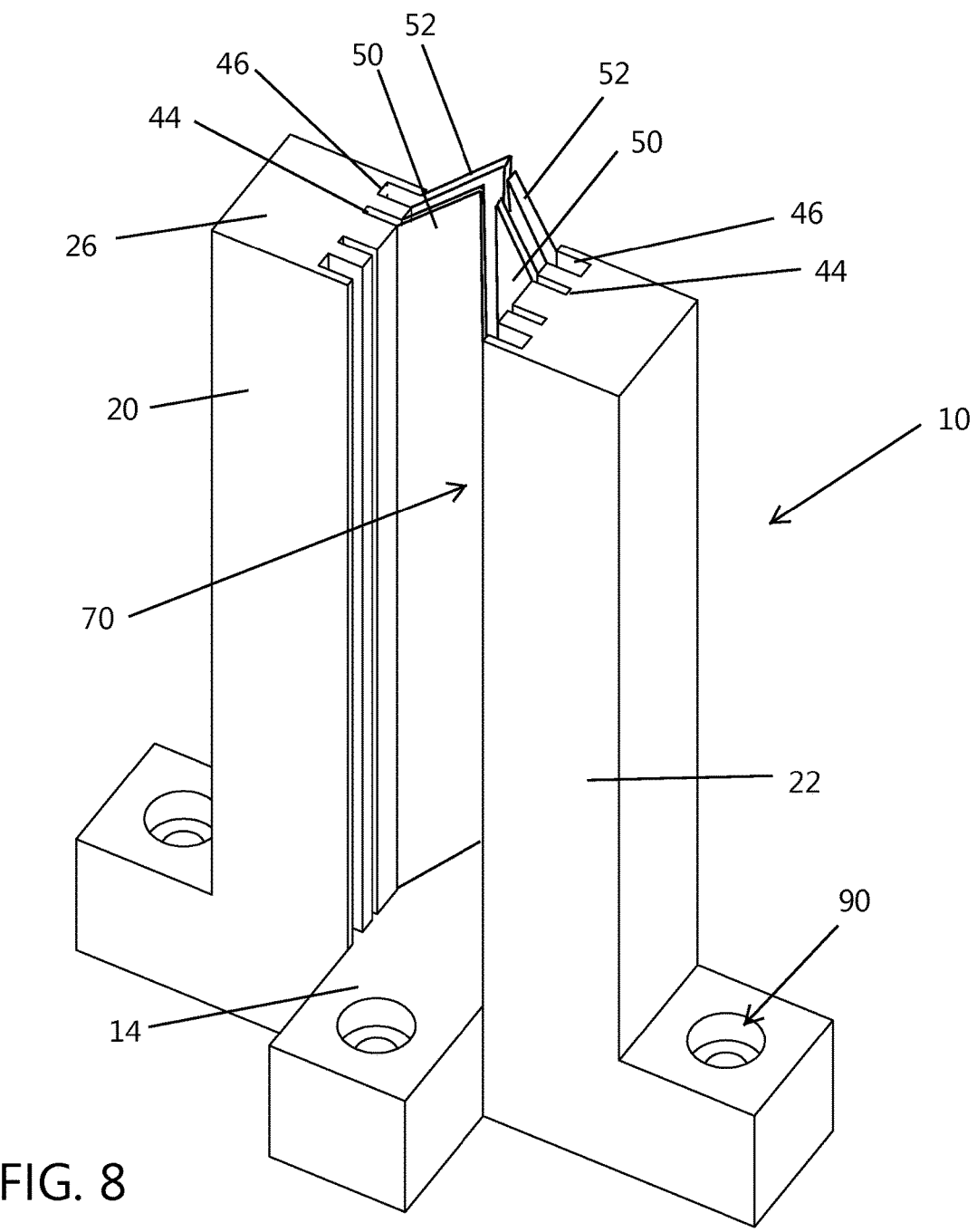
FIG. 8 is an upper, front, perspective view of an embodiment of a peg apparatus of the present invention.
Figure 9:
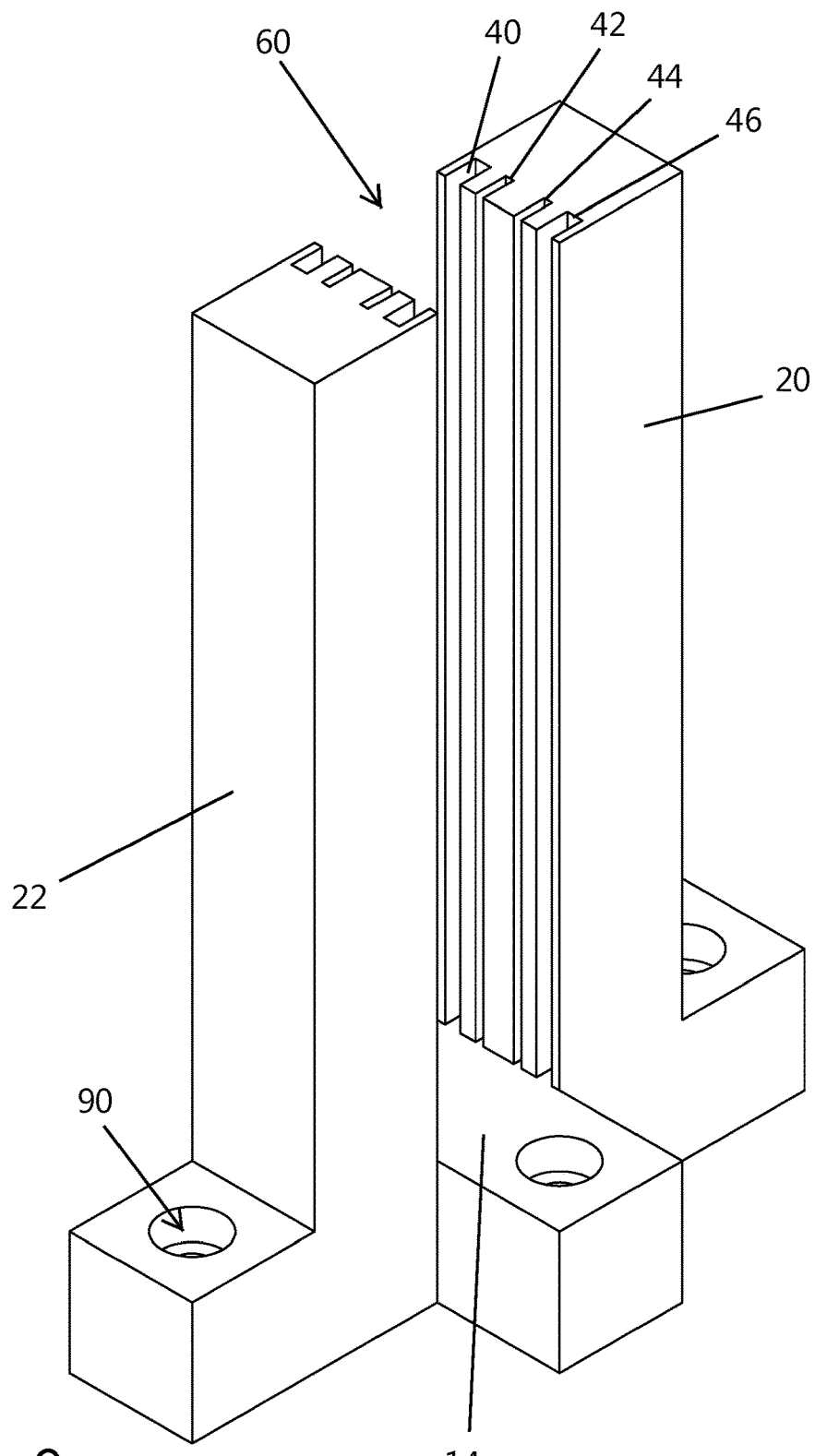
FIG. 9 is an upper back perspective view of the peg apparatus of the type shown in FIG. 8 and showing the pliable flaps removed.

FIGS. 8 and 9 illustrate a peg 10 embodiment according to aspects of the invention having four pairs of slots 40, 42, 44, and 46 that are adapted to receive corresponding pairs of flaps. Those skilled in the art will appreciate that numerous configurations may be created by adding or removing flap pairs to one or more of the slot pairs. The number of flap pairs and spacing between the flap pairs may be chosen to increase or decrease the amount of resistance provided against a wire held in place between the flap pairs. The peg 10 includes a base 14, main body 16, slot pairs 40, 42, 44, and 46, and top 26. The main body incudes first and second, opposed, upwardly extending sides 20 and 22 that together form a wire receiving portion or channel 60. The slot pairs 40, 42, 44, and 46 formed in the opposing sides 20 and 22 are adapted for receiving bi-directional, pliable flaps 50 and 52. The opposing flaps may be positioned in opposing slot pairs or in other slot arrangements. The flap pairs extend toward each other and may overlap or may be separated to form a slight gap between the opposing pair of flaps. A wire may be positioned down and into the wire receiving channel 60 and in contact with the pliable flaps. The amount of gap, spacing between flap pairs, number of flap pairs, and orientation of flap pairs may be selected depending upon the type of wire being positioned in the wire receiving channel 60 and depending more generally upon the routing of the wire on the wire harness pegboard. The sides and flaps together form the wire retention portion 70 that retains the wire in the channel and restricts vertical and lateral movement of the wire in the channel. The base 14 includes apertures 90 extending through the base. The apertures 90 are adaptable for receiving pins that extend through the apertures and engage the peg 10 to the wire harness peg board.

Figure 10:
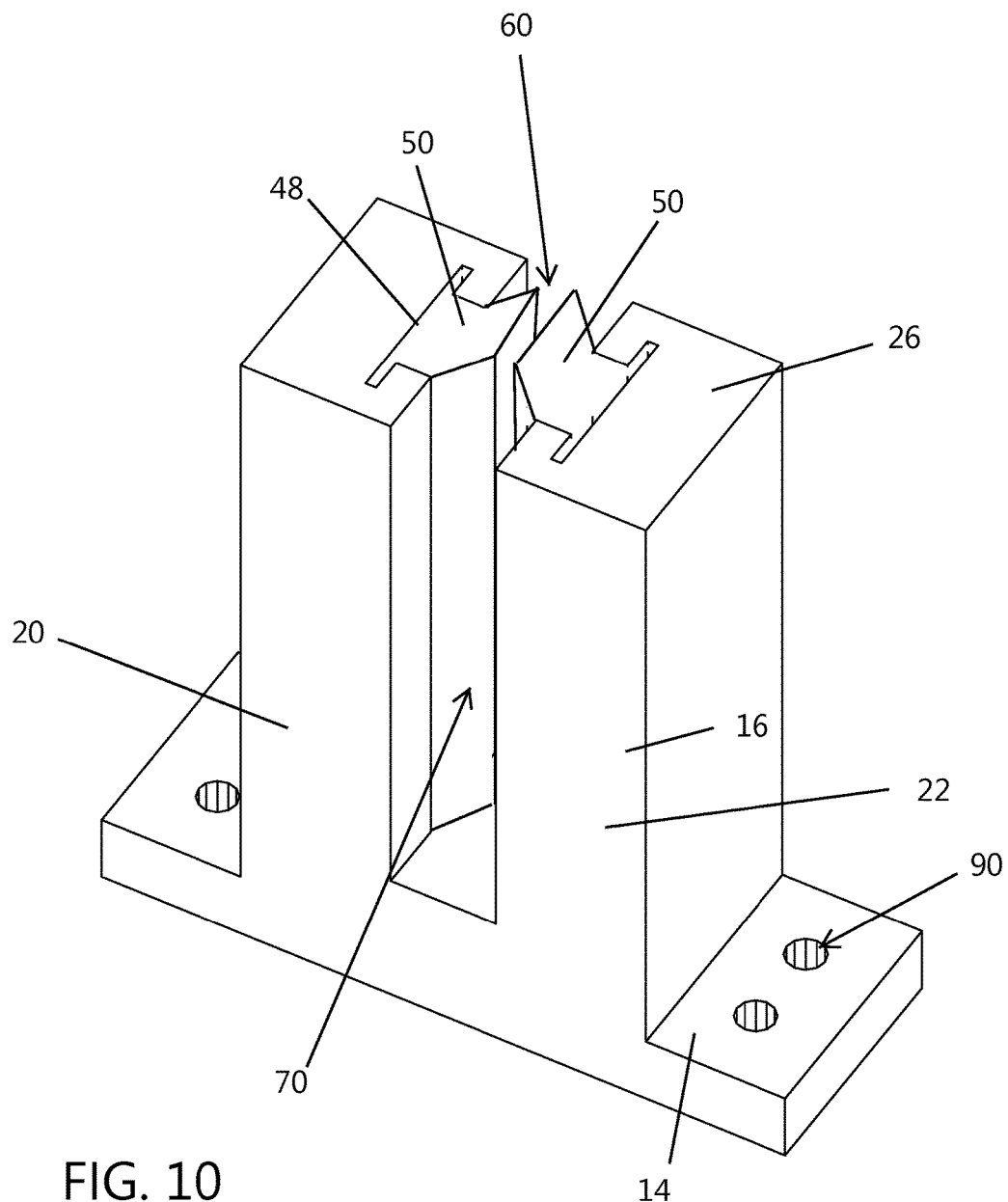
FIG. 10 is an upper, front perspective view of an embodiment of a peg apparatus of the present invention, showing a thick pliable flap inserted in a slot of the main body.

FIG. 10 illustrates a peg 10 embodiment according to aspects of the invention having a single pair of slots 40 that includes an interlocking feature 48 to interlock flap 50 within the slot. Those skilled in the art will appreciate that the pliable, flexible, flap 50 is thicker than the thickness dimension of other shown and described embodiments. The thickness of flap 50 may be chosen to increase or decrease the amount of resistance provided against a wire held in place between the flap pair. The peg 10 includes a base 14, main body 16, slot pair 40, and top 26. The main body incudes first and second, opposed, upwardly extending sides 20 and 22 that together form a wire receiving portion or channel 60. The slot pair formed in the opposing sides 20 and 22 are is adapted for receiving the bi-directional, pliable, interlocking flap 50. The sides and flaps together form the wire retention portion 70 that retains the wire in the channel and restricts vertical and lateral movement of the wire in the channel. The base 14 includes apertures 90 extending through the base. The apertures 90 are adaptable for receiving pins that extend through the apertures and engage the peg 10 to the wire harness peg board.

Figure 11:
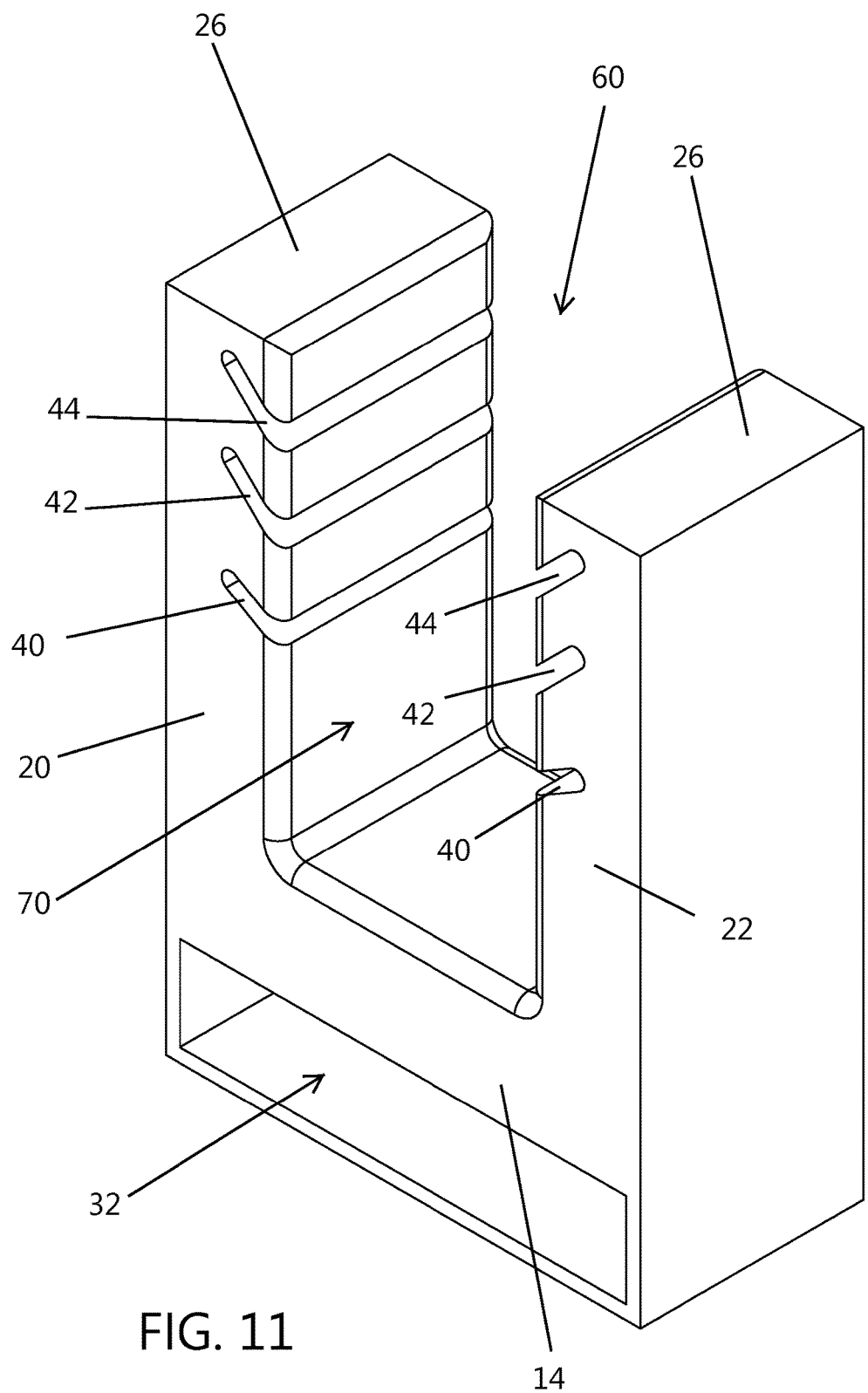
FIG. 11 is an upper front perspective view of an embodiment of a peg apparatus of the present invention, showing slots suitable to receive pliable rubber flaps.

FIG. 11 illustrates another peg 10 embodiment according to aspects of the invention having laterally oriented pairs of slots 40, 42, and 44 extending into sides 20 and 22. The peg 10 includes a base 14, main body, slot pairs 40, 42, and 44, magnet receiving pocket 32, and top 26. The main body incudes first and second, opposed, upwardly extending sides 20 and 22 that together form a wire receiving portion or channel. The slot pairs 40, 42, and 44 formed in the opposing sides 20 and 22 are adapted for receiving bi-directional, pliable flaps.

Figure 19:
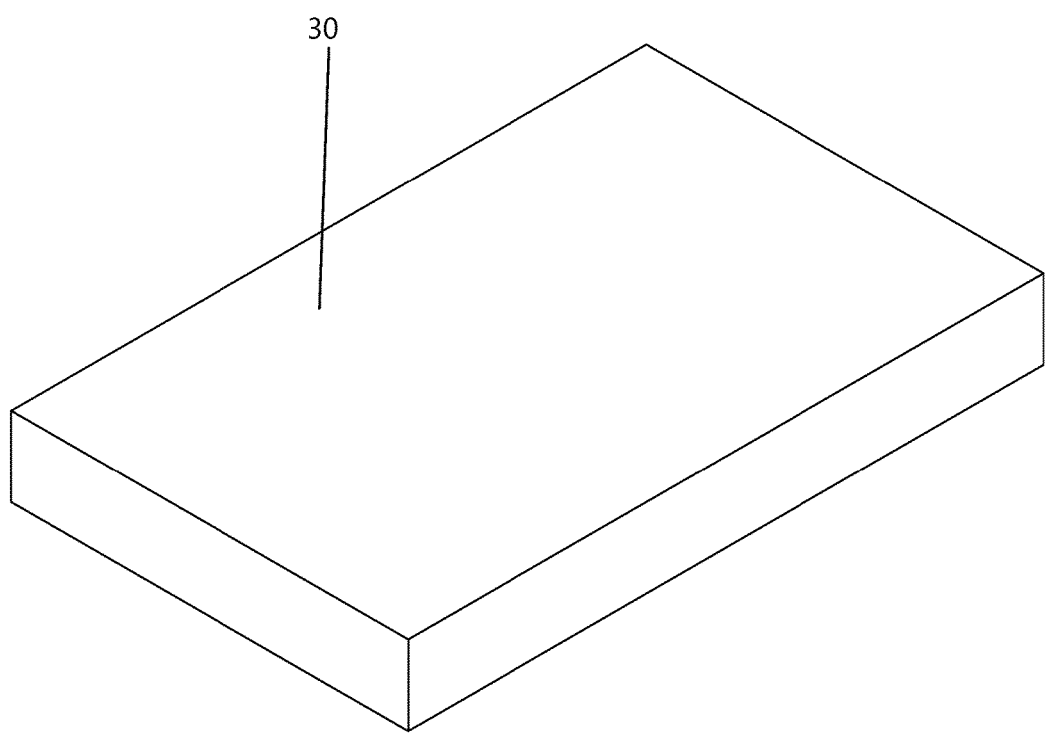
FIG. 19 is a perspective view of a magnet of the present invention suitable for association or coupling with a base of the type shown in FIG. 18.

The opposing flaps may be positioned in opposing slot pairs or in other slot arrangements. The flap pairs extend toward each other and may overlap or may be separated to form a slight gap between the opposing pair of flaps. A wire may be positioned down and into the wire receiving channel 60 and in contact with the pliable flaps. The amount of gap, spacing between flap pairs, number of flap pairs, and orientation of flap pairs may be selected depending upon the type of wire being positioned in the wire receiving channel 60 and depending more generally upon the routing of the wire on the wire harness pegboard. Further the orientation of the flaps is particularly well suited for retaining larger diameter wires in the channel while also restricting vertical and lateral movement of the wire in the channel. The base 14 includes magnet receiving pocket 32 formed through the base. The pocket 32 is adaptable for receiving magnet 30 (illustrated in FIG. 19) to magnetically couple the peg 10 to the wire harness peg board.

Figure 12:
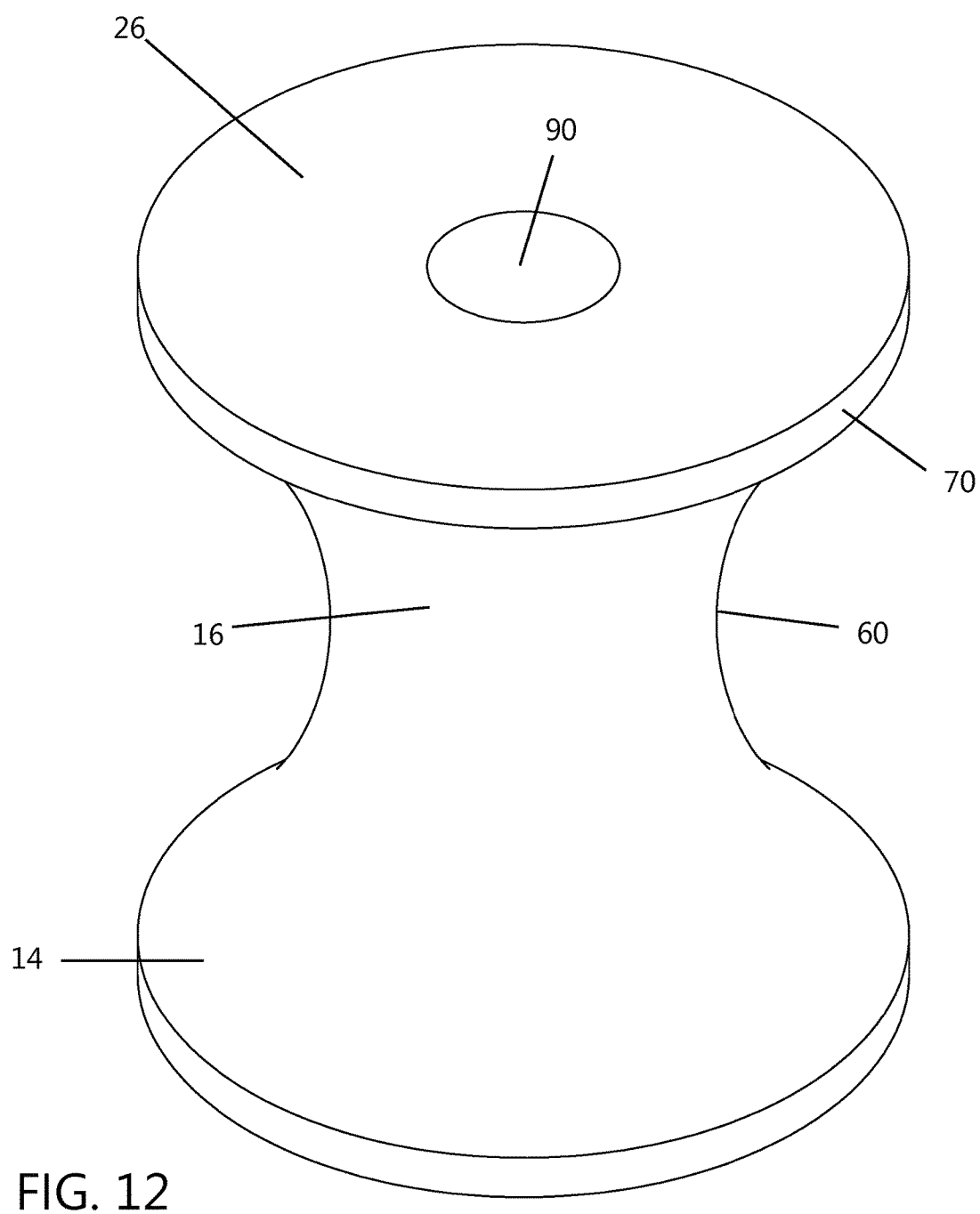
FIG. 12 is an upper, front perspective view of an embodiment of a peg apparatus of the present invention, having a substantial mushroom shape.
Figure 13:
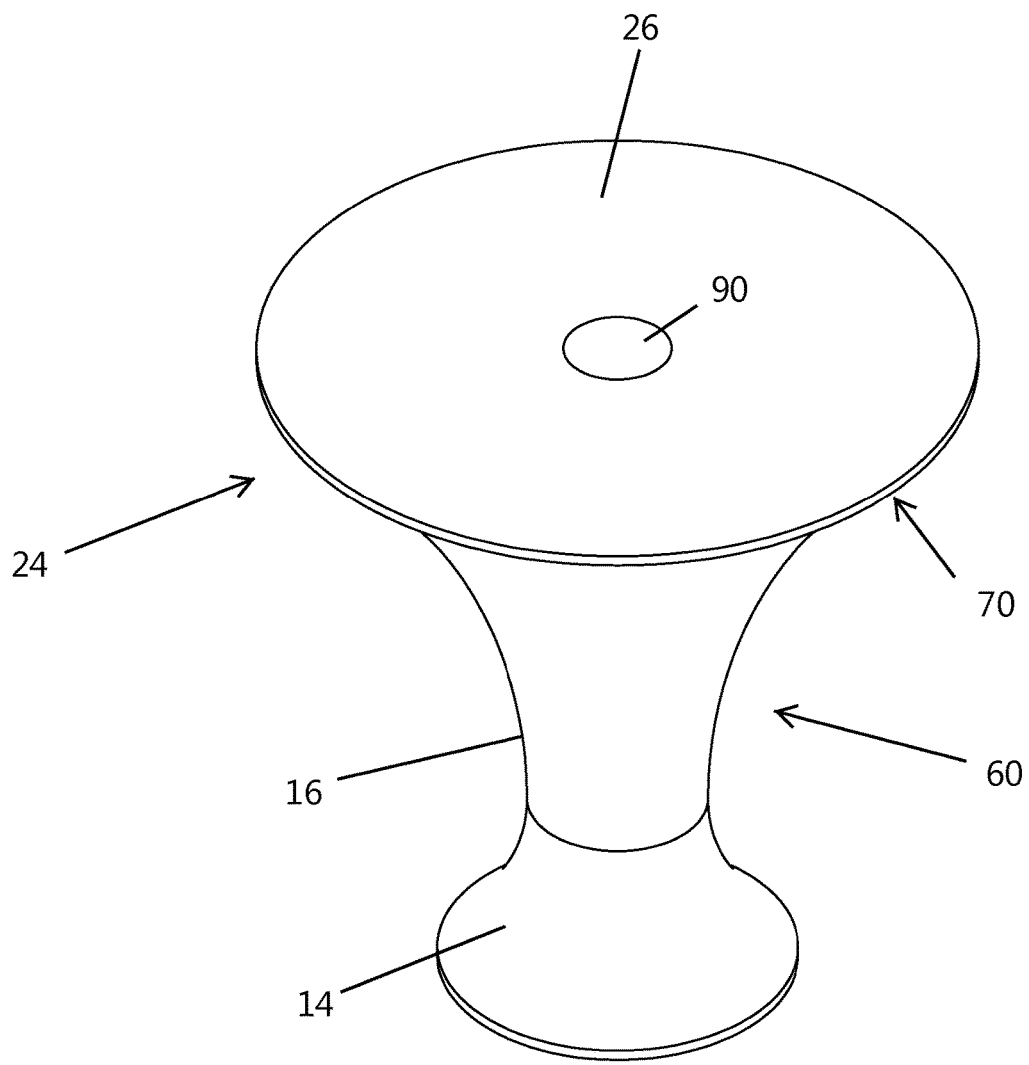
FIG. 13 is an upper, front perspective view of an embodiment of a peg apparatus of the present invention, having a substantial mushroom shape.
Figure 18:
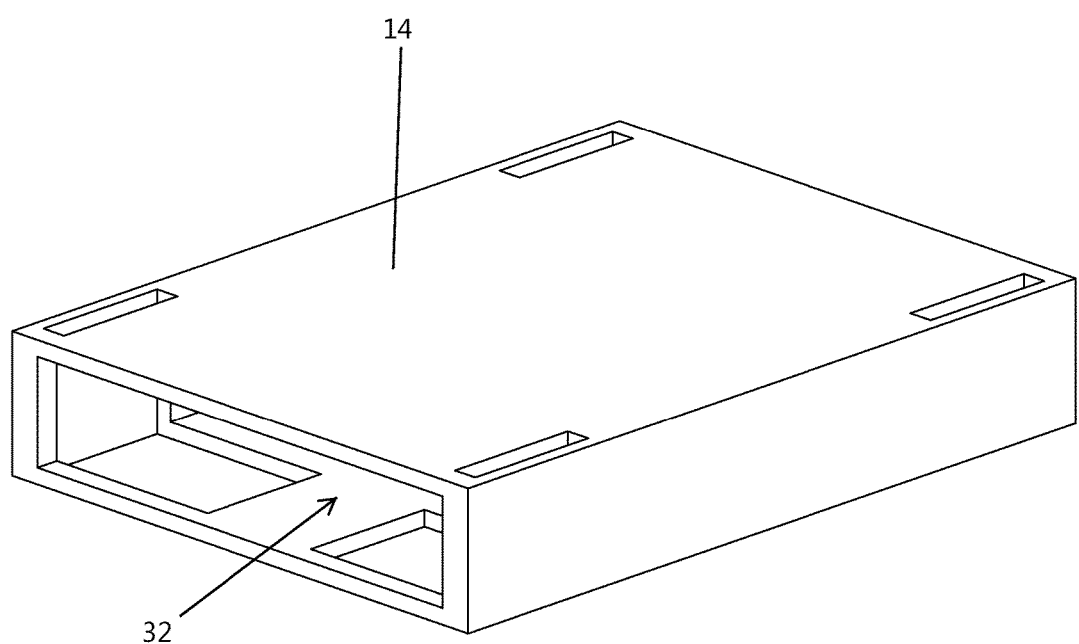
FIG. 18 is a perspective view of an embodiment of a peg base of the present invention.
Figure 20:
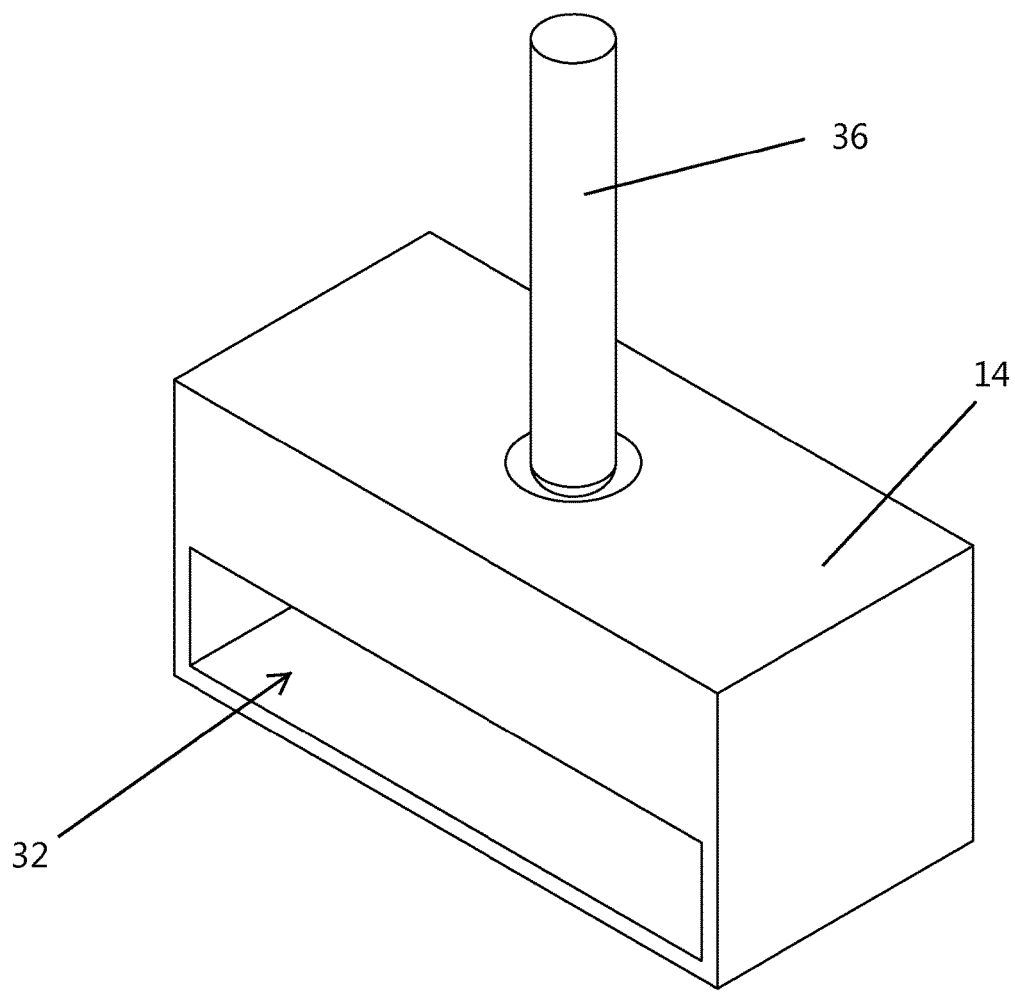
FIG. 20 is a perspective view of an embodiment of a peg base or peg assembly of the present invention.
Figure 21:
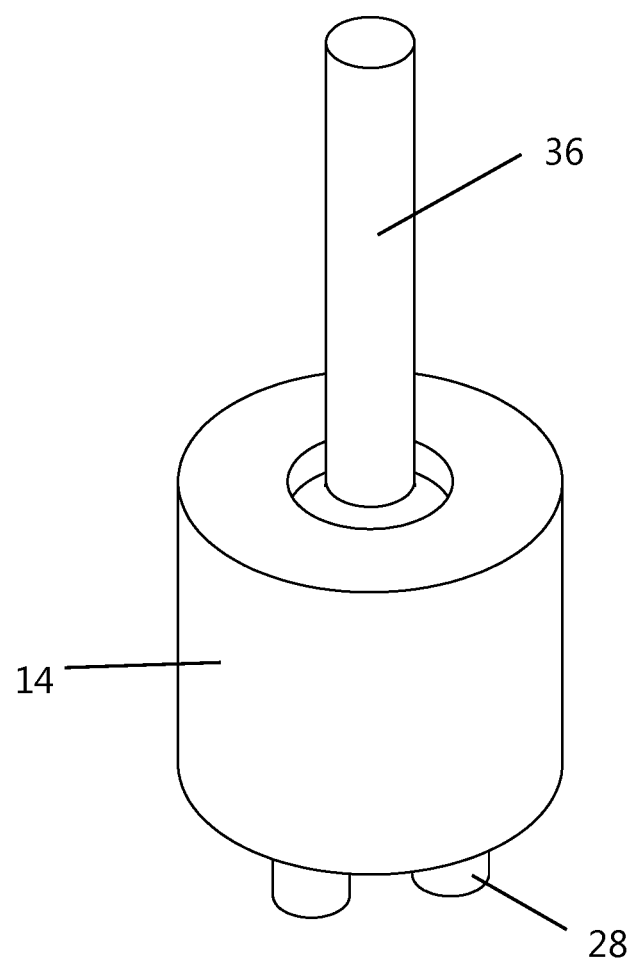
FIG. 21 is a perspective view of an embodiment of a peg base of the present invention.
Figure 22:
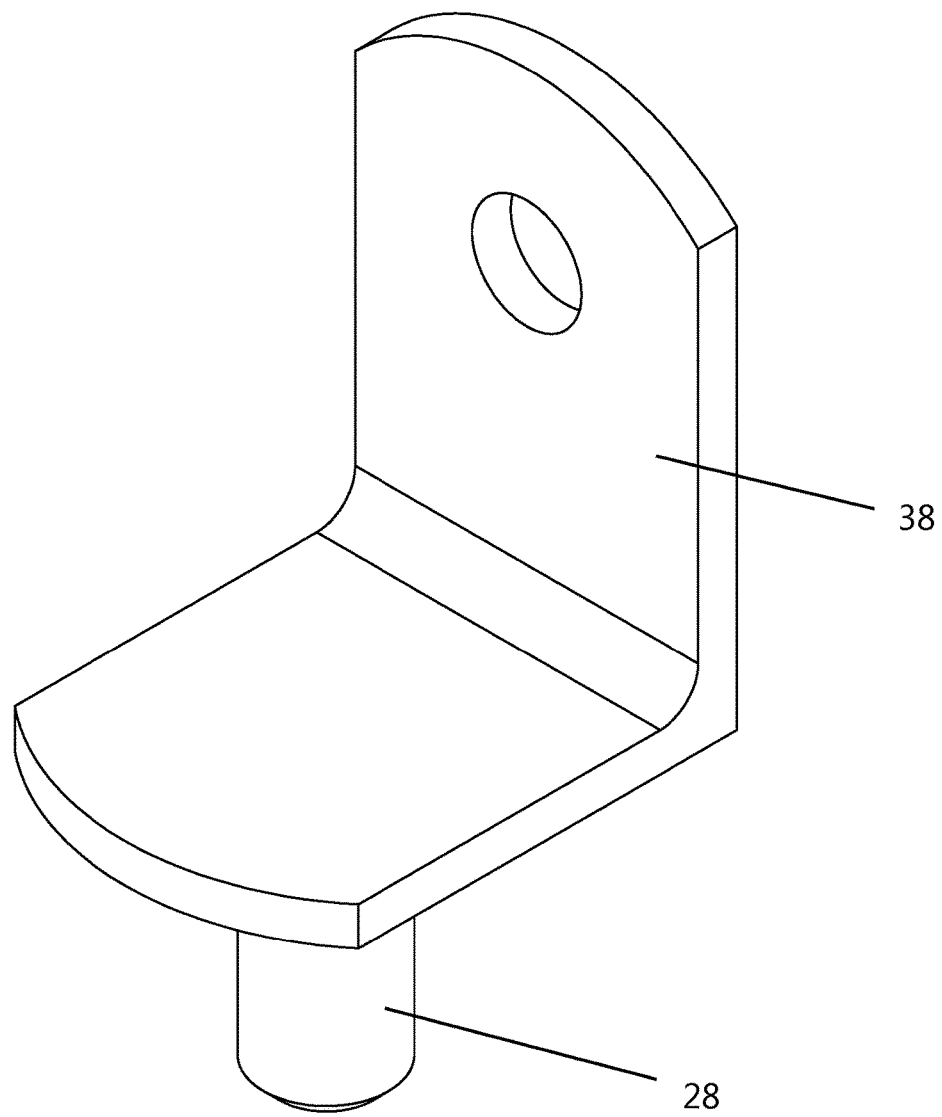
FIG. 22 is a perspective view of an embodiment of a peg bracket of the present invention.

With reference to FIGS. 12 and 13 mushroom shape 24 pegs 10 according to aspects of the invention are illustrated. The peg 10 includes a base 14, main body 16, and top 26. The main body 16 at least partially resembles a spool or cylinder but is modified so that the diameter of the top 26 is larger than a diameter of a mid-portion of the main body 16 and/or the base 14. In this manner, an upper portion of the peg forms the wire retention portion 70 and the mid portion of the main body forms the wire receiving portion 60. Aperture 90 extends through peg 10 and is adaptable to receive an alignment pin 36 to couple the peg to a wire harness pegboard. By way of example and without limitation FIGS. 20 and 21 illustrate coupling members that include an alignment pin 36. The aperture 90 of the peg may be aligned with the coupling member, allowing the alignment pin 36 to extend through the aperture 90. The coupling member shown in FIG. 20 includes a base 14 and magnet receiving pocket 32. The pocket 32 is adaptable for receiving magnet 30 (illustrated in FIG. 19) to magnetically couple the coupling member and peg 10 to a wire harness peg board. Alternatively, the coupling member illustrated in FIG. 21 includes an extension of base 14 and alignment pins 28 extending from a bottom of the base 14. The alignment pins 28 may be utilized to couple the pegs 10 to a wire harness peg board in a desired location on the board. As a further alternative, a support bracket 38 having an alignment pin 28 may be utilized to couple the mushroom pegs 10 onto the wire harness pegboard in a varied orientation. FIG. 18 also illustrates a base 14 having a magnet receiving pocket 32. The base of FIG. 18 may be modified to create an extension to the base 14 of the peg 10 and to magnetically couple to a wire harness pegboard.

Figure 14:
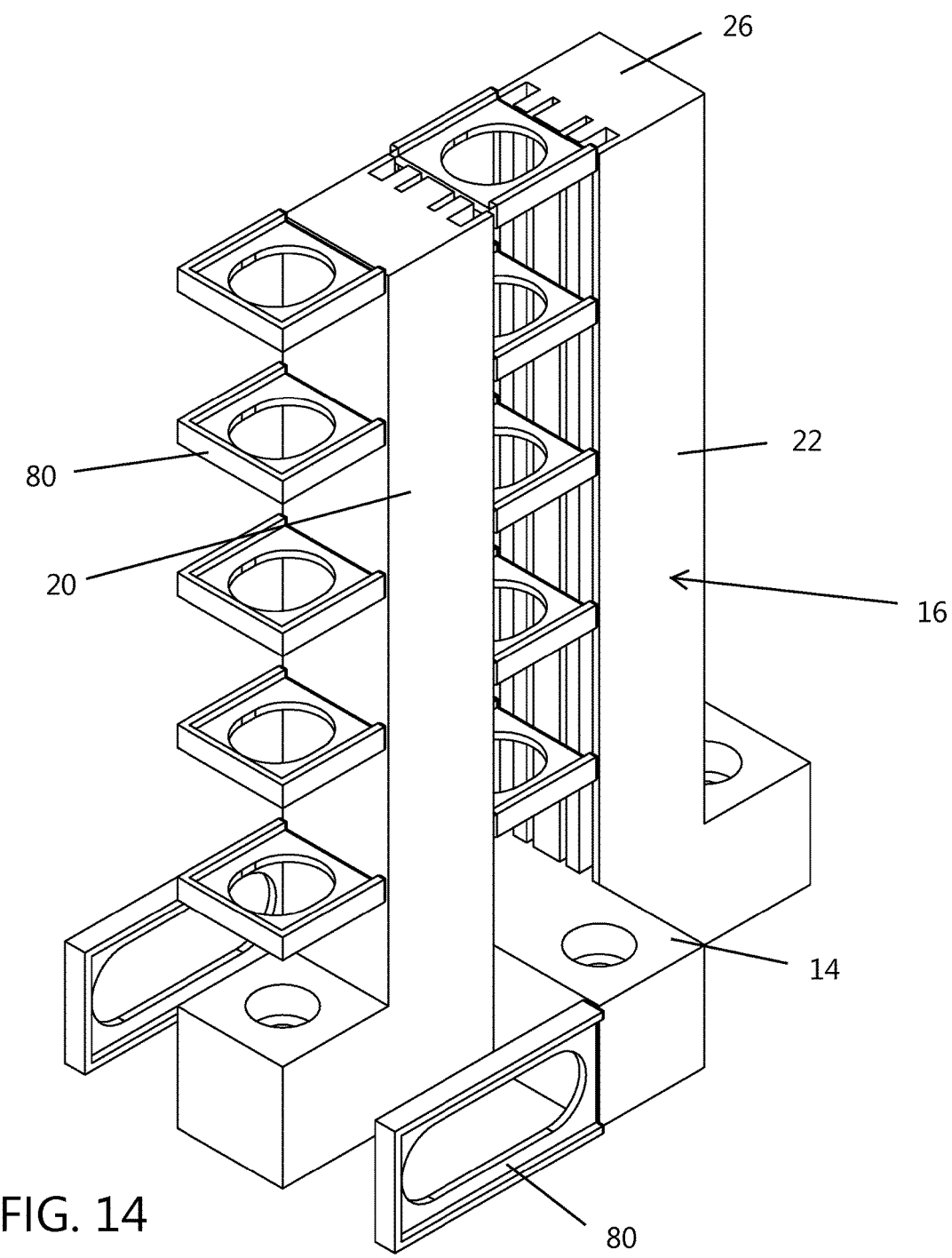
FIG. 14 is an upper perspective view of an embodiment of a peg apparatus of the present invention, showing a channel diverter coupled to a main body of the peg apparatus.
Figure 15:
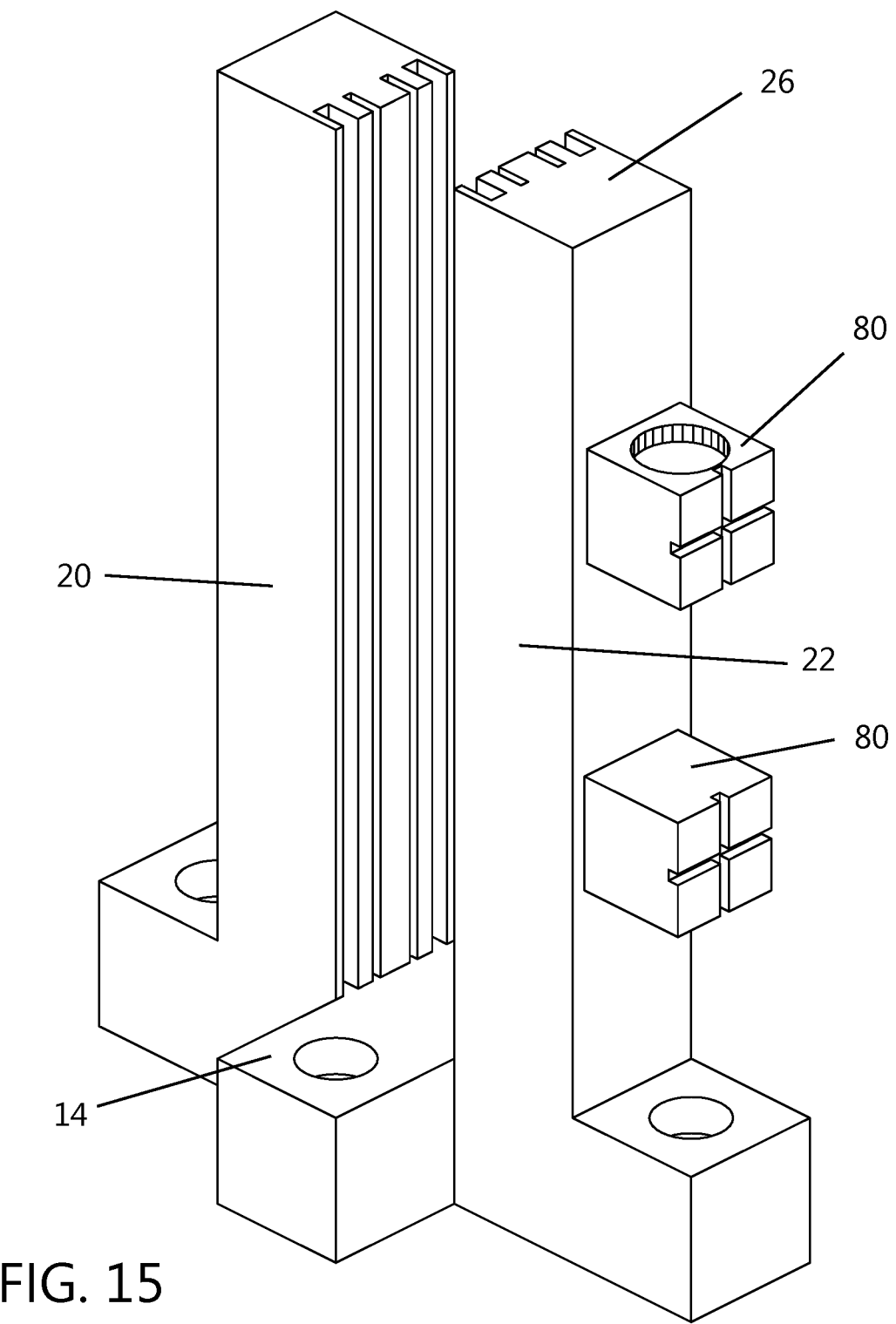
FIG. 15 is an upper perspective view of an embodiment of a peg apparatus of the present invention, showing a channel diverter coupled to a main body of the peg apparatus.
Figure 16:
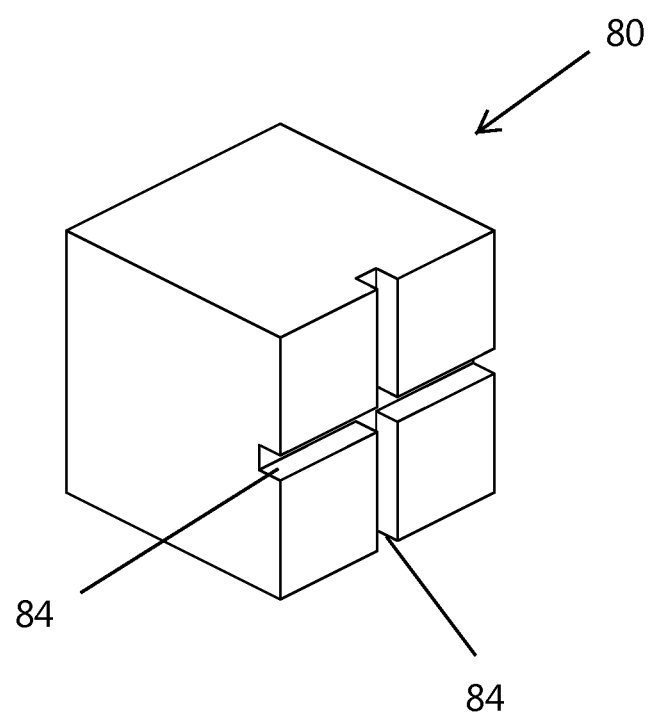
FIG. 16 is a perspective view of an embodiment of a channel diverter of the present invention.
Figure 17:
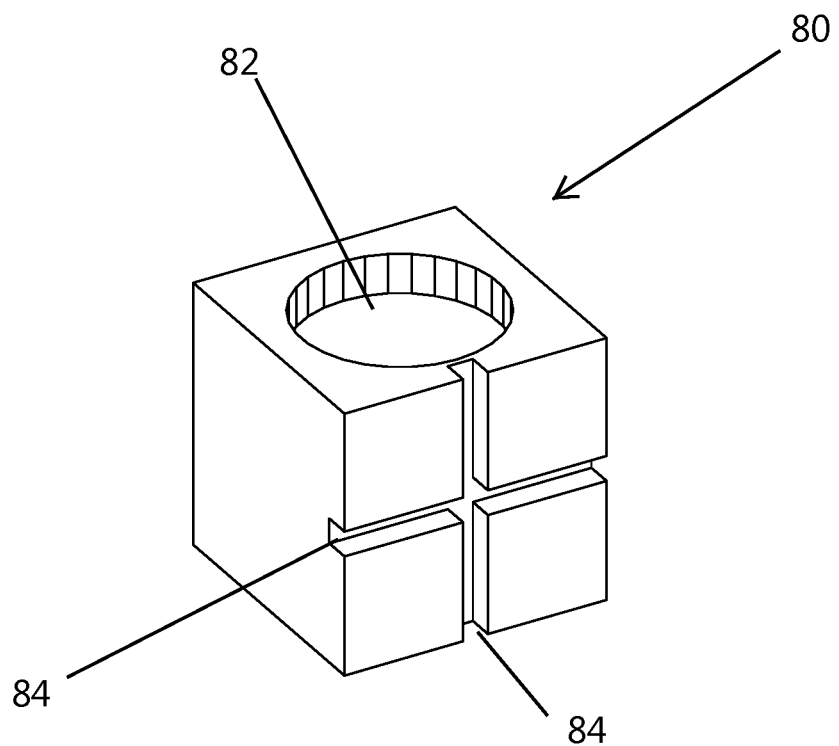
FIG. 17 is a perspective view of an embodiment of a channel diverter of the present invention.

FIGS. 14 and 15 illustrate a peg 10 embodiment according to aspects of the invention having wire channel diverters 80 coupled to portions of the peg 10. The wire channel diverter 80 may be positioned on the peg in a desired location to further direct a wire in a preferred orientation. Those skilled in the art will appreciate that numerous configurations may be created by adding or removing one or more diverters 80. FIGS. 16 and 17 further illustrate alternate embodiments of the diverter 80. The diverter 80 includes slots and one or more magnetic pockets 82. The slots may be utilized to contain rubber sheet material (for example, glued into the slots) as another modular option to manage the wire on the pegboard. The magnet receiving pockets 82 are adapted to receive magnets. Further, the diverter and peg 10 may be constructed of a ferromagnetic material to allow the diverter to magnetically couple to the peg 10.

Figure 23:
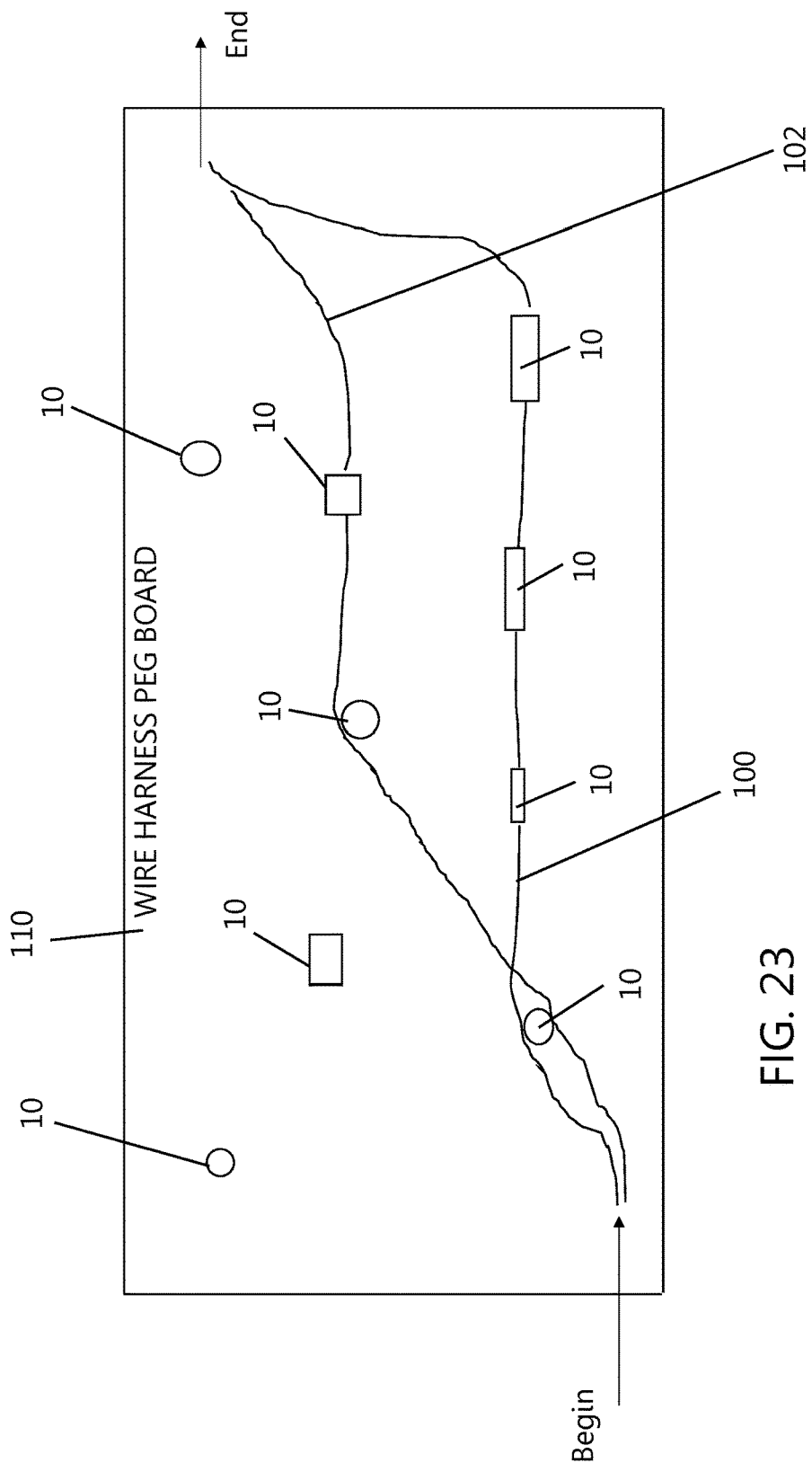
FIG. 23 is a plan view of a wire harness peg board having pegs shown in block diagram form arranged on the peg board and exemplary wires routed around the pegs.
Figure 24:
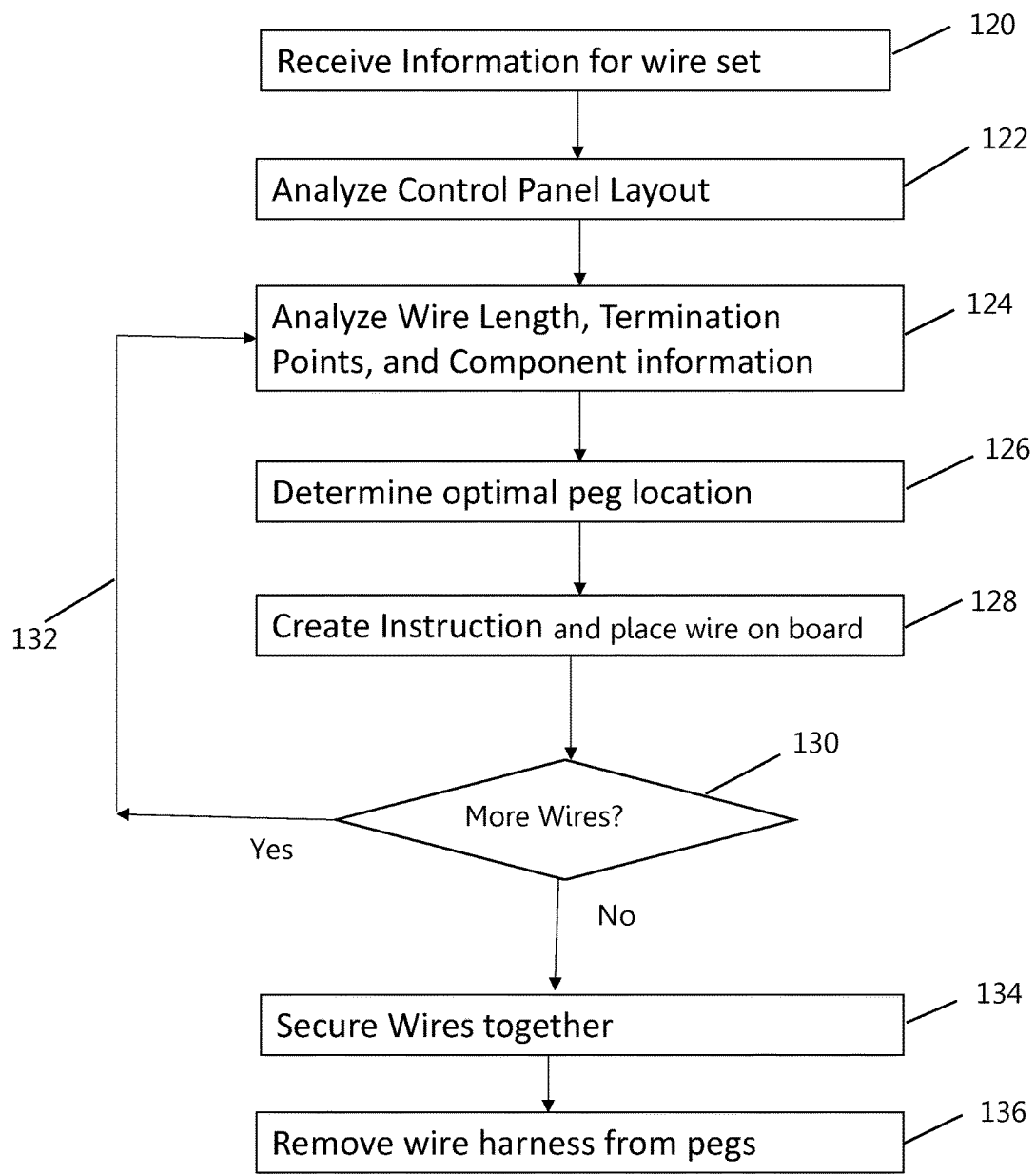
FIG. 24 is a flowchart illustrating the method of assembling a wire harness utilizing pegs and a pegboard of the present invention.

With reference to FIGS. 23 and 24 the method of assembling a wire harness in accordance with aspects of the invention will be described in greater detail. The method according to aspects of the invention is particularly well suited for implementation into an automated system, such as a robot, that automatically places wires (for example wires 100 and 102) of varying length and gauge on a wire harness peg board 110. The automated system utilizes pegs 10 of the present invention such that the free ends of each wire 100, 102 do not require clamps or tie offs to anchor the wire and avoid lateral or upward movement of the wires about pegs 10.

An automated assembly of a wire harness that utilizes automated equipment requires transmitting and receiving information 120 corresponding to each wire of the wire harness, analyzing a desired layout, 122, analyzing and determining an optimal wire length, termination points, and peg component information 124, determining optimal peg location 126 depending upon the outcome of the layout and information analysis, and creating automated tooling instructions to place wires on the peg board 110. Those skilled in the art will appreciate that the automated system may analyze the information, determine optimal peg location and create instructions for all the wires in the wire set prior to the placement of any of wires on the pegboard 110.

In accordance with aspects of the invention, in an embodiment of the invention the automated tool utilizes the instructions to place each desired wire on the pegboard. After each wire is placed the system determines whether additional wires are to be placed on the peg board. If an additional wire is required, the system analyzes the wire length, termination points, and component information 124 to determine the optimal peg locations on the pegboard 126 and creation of instructions for the wire placement tool path 128. Once all the desired wires are placed on the peg board 110, the bundle of wires are secured together 134 at multiple points to create a unitary wire harness. The harness is then removed from the peg board 136 and the automated tool waits for the transmission of information corresponding to the next wire set.

In general terms, if control panels can be thought of as the brains and an OEM product as the body, then the wire harness that connects the brains to the body can be thought of as the nervous system. And, thus, for each potential control panel utilized in conjunction with an OEM product family, there is a unique harness that is required to connect the control panel to the OEM product. Exemplary systems for determining the information for a wire set, analyzing a control panel layout, and analyzing the wire set information for an optimal wire harness for a particular control panel has been described in U.S. Pat. No. 9,311,432B1 the entire disclosure of which is incorporated by reference. Once the optimal wire harness is defined the system determines the optimal location for pegs on the peg board to reduce lateral movement of the wires while the wires are placed on the pegboard. Once the optimal peg locations are determined the system generates execution instructions for the automated tool to follow to place the wire on the peg board. The wire set information that is analyzed may include a harness parts and pricing rules database and manufacturing reports. While most of the harness information can be captured in a design ready format, the lengths of the harnesses are dependent on the size, shape and electrical routing within the ordered OEM equipment. Through the exemplary system, OEMs can choose to include this additional harness information along with the control panel configuration when transmitting the wire set information.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A method of assembling a wire harness, said method comprising steps of:
    determining a composition of wires of a wire set of a desired wire harness;
    obtaining information about the wires of the wire set that forms the desired wire harness;
    analyzing the information about the wires of the wire set;
    utilizing a wire harness peg board suitable for forming the wire harness;
    utilizing pegs on the wire harness peg board;
    determining a desired location for the pegs on the wire harness peg board that enables formation of the desired wire harness;
    creating automated assembly instructions; and
    placing each of the wires of the wire set of the desired wire harness on the harness peg board in accordance with the created automated assembly instructions;
    wherein each of the pegs includes:
    a base having a bottom portion suitable for coupling to the wire harness peg board;
    a main body extending upward from the base;
    a bi-directional wire receiving portion for receiving one or more wires of the wire set of the desired wire harness, said wire receiving portion being congruent with a mid-portion of said main body;
    a passive, bi-directional wire retaining portion that is congruent with said wire receiving portion and also congruent with an upper portion of said main body;
    said wire retaining portion further includes a pliable portion that restricts movement in the lateral direction of the one or more wires of the wire set of the desired wire harness; and
    wherein said bi-directional wire retaining portion restricts movement in an upward and downward direction of the one or more wires of the wire set of the desired wire harness.

2. The method as recited in claim 1, wherein each of said pegs further includes a magnet associated with the bottom portion of the base of each of the pegs.

3. The method as recited in claim 1, wherein said wire retaining portion of each of said pegs includes pliable rubber folds that grip the one or more wires of the wire set of the desired wire harness.

4. The method as recited in claim 3, wherein a thickness of at least two of the pliable rubber folds is different.

5. The method as recited in claim 1, further including the step of securing together at least two of said wires of the wire set to form the desired wire harness.

6. The method as recited in claim 5, further including the step of removing the desired wire harness from the wire harness peg board.

7. A method of assembling a wire harness, said method comprising steps of:
    identifying a desired wire set for a wire harness;
    obtaining information related to a wire length, wire gauge and optimal termination points for each wire of the desired wire set of the wire harness;
    analyzing the information for each wire of the desired wire set of the wire harness;
    utilizing a wire harness peg board;
    utilizing pegs on the wire harness peg board;
    determining an optimal location of the pegs on the wire harness peg board to enable formation of the wire harness in accordance with the desired wire set of the wire harness, wherein the pegs include:

a bi-directional wire receiving portion for receiving one or more wires of the wire set;

a passive, bi-directional wire retaining portion that is congruent with the wire receiving portion;

the passive bi-directional wire retaining portion further includes a pliable portion that restricts movement of the one or more wires of the wire set in a lateral direction; and wherein the passive bi-directional wire retaining portion restricts movement of the wire in an upward and downward direction;

creating automated assembly instructions;

positioning pegs on the wire harness peg board in accordance with the determined optimal location of the pegs on the wire harness peg board;

placing each wire of the desired wire set of the wire harness adjacent the wire harness peg board in conjunction with the determined optimal locations of the pegs on the wire harness peg board to enable formation of the wire harness in accordance with the desired wire set of the wire harness.

8. The method as recited in claim 7, further including the step of coupling the pegs to the wire harness peg board utilizing magnets associated with a bottom portion of the pegs.

9. The method as recited in claim 7, wherein the passive bi-directional wire retaining portion of the pegs includes pliable rubber folds that grip the one or more wires of the wire set of the wire harness.

10. The method as recited in claim 9, wherein a thickness of at least two of the pliable rubber folds is different.

11. The method as recited in claim 7, further including the step of securing wires of the wire set of the wire harness together.

12. The method as recited in claim 11, further including the step of removing the wire harness from the peg board.

* * * * *